(12) United States Patent
Sasaki et al.

(10) Patent No.: US 6,856,722 B2
(45) Date of Patent: Feb. 15, 2005

(54) OPTICAL DEMULTIPLEXER AND OPTICAL MULTIPLEXER FOR WAVELENGTH DIVISION MULTIPLEX COMMUNICATION

(75) Inventors: Hironori Sasaki, Yamanashi (JP); Yutaka Okabe, Tokyo (JP)

(73) Assignee: Oki Electric Industry Co., LTD, Tokyo (JP)

( * ) Notice: Subject to any disclaimer, the term of this patent is extended or adjusted under 35 U.S.C. 154(b) by 44 days.

(21) Appl. No.: 10/367,694

(22) Filed: Feb. 19, 2003

(65) Prior Publication Data

US 2004/0033014 A1 Feb. 19, 2004

(30) Foreign Application Priority Data

Feb. 18, 2002 (JP) ...................................... 2002-039526

(51) Int. Cl.⁷ .............................................. G02B 6/28
(52) U.S. Cl. ............................. 385/24; 385/15; 385/37
(58) Field of Search .......................... 385/14–15, 17–18, 385/24, 37, 130, 132

(56) References Cited

U.S. PATENT DOCUMENTS

| | | | | |
|---|---|---|---|---|
| 6,075,632 A | * | 6/2000 | Braun | 398/79 |
| 6,198,864 B1 | * | 3/2001 | Lemoff et al. | 385/47 |
| 6,404,947 B1 | * | 6/2002 | Matsuda | 385/24 |
| 6,542,306 B2 | * | 4/2003 | Goodman | 359/634 |
| 6,563,976 B1 | * | 5/2003 | Grann et al. | 385/24 |

FOREIGN PATENT DOCUMENTS

JP 2000-162466 6/2000

* cited by examiner

Primary Examiner—Michael G. Lee
Assistant Examiner—Seung H Lee
(74) Attorney, Agent, or Firm—Wenderoth, Lind & Ponack, L.L.P.

(57) ABSTRACT

An optical demultiplexer/multiplexer for wavelength division multiplex communication includes: a light irradiating unit for irradiating a spherical wave containing light waves of different wavelengths; optical fibers for respectively receiving the different wavelengths of the demultiplexed light wave; a converting lens for receiving the spherical wave and converting the spherical wave into a parallel wave; WDM filters each for selecting and reflecting the light wave in the parallel wave and transmitting the residual light waves; guide lenses for receiving the light waves reflected by the WDM filters, converging, and transmitting the light waves to the optical fibers; and reflecting mirrors for receiving the light waves and reflecting the light waves toward the WDM filters. The parallel wave advances from the converting lens, is selected and reflected by the WDM filter, reflected, returned to the WDM filter, selected and reflected again, converged by the guide lens, and demultiplexed by the optical fiber every wavelength.

4 Claims, 4 Drawing Sheets

OPTICAL DEMULTIPLEXER AND OPTICAL MULTIPLEXER FOR WAVELENGTH DIVISION MULTIPLEX COMMUNICATION

BACKGROUND OF THE INVENTION

1. Field of the Invention

The present invention relates to an optical demultiplexer and an optical multiplexer for wavelength division multiplex communication which are used for wavelength division multiplex communication.

2. Description of the Related Background Art

In recent years, the development of optical fiber communication has been remarkable and the number of optical fiber communication lines is rapidly increasing. That is, to say nothing of a public line network, the number of lines for optical fiber communication is increasing also in the field of a computer network that is arranged in a building or a relatively small area. Therefore, a WDM (Wavelength Division Multiplexing) communication system is drawing attention as an effective measure for preventing an increase in the number of optical fiber communication lines. According to the WDM communication system, N light waves of different wavelengths are multiplexed into a single mode optical fiber and are transmitted from the transmission side. On the reception side, the received multiplexed light is demultiplexed to the N light waves of the different wavelengths. Thus, an amount of information which can be transmitted in the optical fiber can be increased to a value that is N times as large as the amount of information which can be transmitted in the case of transmitting only a light signal of a single wavelength.

In the WDM communication system, an optical demultiplexer and an optical multiplexer for wavelength division multiplex communication are provided for demultiplexing to or multiplexing the N light waves of the different wavelengths. In such an optical demultiplexer and optical multiplexer for wavelength division multiplex communication, excellent demultiplexing and multiplexing characteristics are naturally demanded and the optical demultiplexer and the optical multiplex are also required to be obtained at a low price.

An example of a conventional optical demultiplexer for wavelength division multiplex communication will now be described with reference to FIG. 4.

Figure 4:
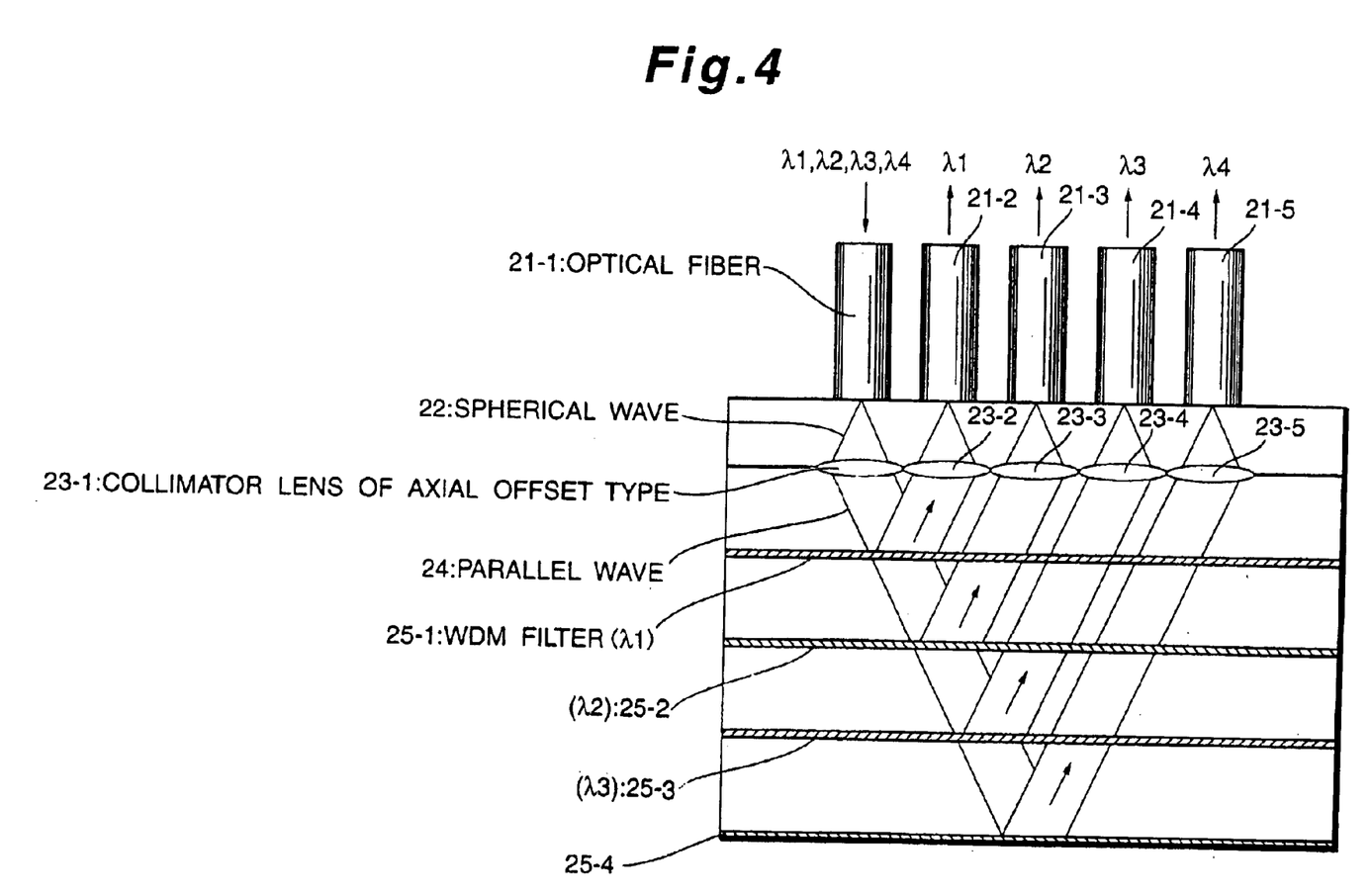
FIG. 4 is a constructional diagram of a conventional optical demultiplexer for wavelength division multiplex communication.

FIG. 4 is a constructional diagram of the conventional optical demultiplexer for wavelength division multiplex communication.

In the conventional demultiplexer, as described in detail in Japanese Patent Application No. 2000-366746 (by the same applicant as that of the present invention), a light multiplexed signal comprising four light waves of wavelengths $\lambda 1$ to $\lambda 4$ is emitted as a spherical wave 22 from an optical fiber 21-1. The spherical wave 22 is collimated by a collimator lens 23-1 of an axial offset type and becomes a parallel wave 24. The light wave of the wavelength $\lambda 1$ in the parallel wave 24 is reflected by a WDM (Wavelength Division Multiplexing) filter ($\lambda 1$) 25-1, is converged by a collimator lens 23-2 of an axial offset type and, further, enters an optical fiber 21-2.

When the parallel wave 24 including the three light waves of the wavelengths $\lambda 2$ to $\lambda 4$ passes through the WDM filter ($\lambda 1$) 25-1, the light wave of the wavelength $\lambda 2$ in the parallel wave 24 is reflected by a WDM filter ($\lambda 2$) 25-2, is converged by a collimator lens 23-3 of an axial offset type and, further, enters an optical fiber 21-3. In a manner similar to the above, the light waves of the wavelengths $\lambda 3$ and $\lambda 4$ also enter optical fibers 21-4 and 21-5 after being reflected by a WDM filter ($\lambda 3$) 25-3 and a mirror 4-1 and converged by a collimator lens 23-4 and 23-5, respectively.

In such an optical demultiplexer for wavelength division multiplex communication, the whole optical system can be constructed in a compact size by using a lens array of a pitch of 250 $\mu$m that is compatible with an MT connector. Upon manufacturing, alignment is only necessary between the lens array and a fiber array is necessary, and alignment of other portions is unnecessary. Further, there are advantages in installation such that the demultiplexer can be manufactured by simply laminating optical substrates, and the like.

The conventional demultiplexer as mentioned above has the following problem to be solved. That is, since the WDM filter slightly reflects and transmits light waves having wavelengths other than the wavelength set in the WDM filter, there is a problem to be solved such that crosstalks among the light waves of different wavelengths increase.

SUMMARY OF THE INVENTION

It is an object of the invention to provide an optical demultiplexer and an optical multiplexer for wavelength division multiplex communication in which crosstalks among light waves with different wavelengths are small.

To solve the above-described problem, the invention provides the following constructions.

<First Construction>

The present invention provides an optical demultiplexer for wavelength division multiplex communication. The optical demultiplexer comprises: a light irradiating unit which irradiates a spherical wave containing a plurality of light waves with different wavelengths; a plurality of light receiving units for respectively receiving each of the light waves contained in the spherical wave; a converting lens for converting the irradiated spherical wave into a parallel wave; a plurality of WDM (Wavelength Division Multiplexing) filters for, with respect to the plurality of light waves contained in the parallel wave, respectively and differently reflecting in sequence only one light wave in the parallel wave and transmitting the other light waves remaining in the parallel wave therethrough; a plurality of guide lenses for respectively converging each of the light waves reflected by the WDM filters into each of the light receiving units; and at least one reflecting unit for reflecting the light waves respectively reflected by each of the WDM filters so as to make the reflected light waves respectively return to the corresponding WDM filter at least one time. In the demultiplexer, each guide lens is placed at a position so as to be capable of guiding one of the light waves finally reflected by the WDM filters into a corresponding one of the light receiving units.

Further, in such an optical demultiplexer, the WDM filter for reflecting the last light wave finally remaining in the parallel wave may be replaced by a reflecting mirror.

<Second Construction>

The present invention also provides an optical multiplexer for wavelength division multiplex communication. The optical multiplexer comprises: a plurality of light irradiating units for respectively irradiating a plurality of light waves with different wavelengths; a light receiving unit for receiving the multiplexed plurality of light waves; a plurality of converting lenses for respectively converting the light waves which are irradiated by the plurality of light irradiating units into a parallel wave; a plurality of WDM (Wavelength Division Multiplexing) filters for, with respect to the plurality of the parallel waves, respectively and differently reflecting in sequence only one parallel wave of the plurality of parallel waves and transmitting the remaining parallel waves therethrough; a guide lens for converging each of the parallel waves which are reflected by the WDM filters into the light receiving unit; and at least one reflecting unit for reflecting the parallel waves respectively reflected by each of the WDM filters so as to make the reflected parallel waves respectively return to the corresponding WDM filter at least one time. In the optical multiplexer, the guide lens is placed at a position so as to be capable of multiplexing the plurality of parallel waves which are finally reflected by the WDM filters and guiding the reflected plurality of parallel waves into the light receiving unit.

Further, in such an optical multiplexer, the WDM filter for reflecting the last parallel wave which is finally transmitted through by the other WDM filter may be replaced by a reflecting mirror.

In the above-stated demultiplexer, the parallel wave is selected and reflected by the predetermined VDM filter every wavelength on the way of the straight progress and the reflected parallel wave is reflected by the reflecting unit, returned to the predetermined WDM filter, and selected and reflected again. Therefore, the light wave of the wavelength which has been selected once by the WDM filter is wavelength selected again by the same WDM filter so that a mixture of the light waves of the other wavelengths decreases and the crosstalks resulting therefrom are reduced.

The above and other objects and features of the present invention will become apparent from the following detailed description and the appended claims with reference to the accompanying drawings.

DETAILED DESCRIPTION OF THE INVENTION

An embodiment of the invention will now be specifically explained hereinbelow with reference to the drawings. For example, an explanation will mow be made with respect to a demultiplexer which receives a light multiplexed signal comprising four waves of wavelengths $\lambda 1$ to $\lambda 4$ and which demultiplexes the light multiplexed signal to light waves of the wavelengths $\lambda 1$ to $\lambda 4$, respectively.

<Construction of the Embodiment>

Figure 1:
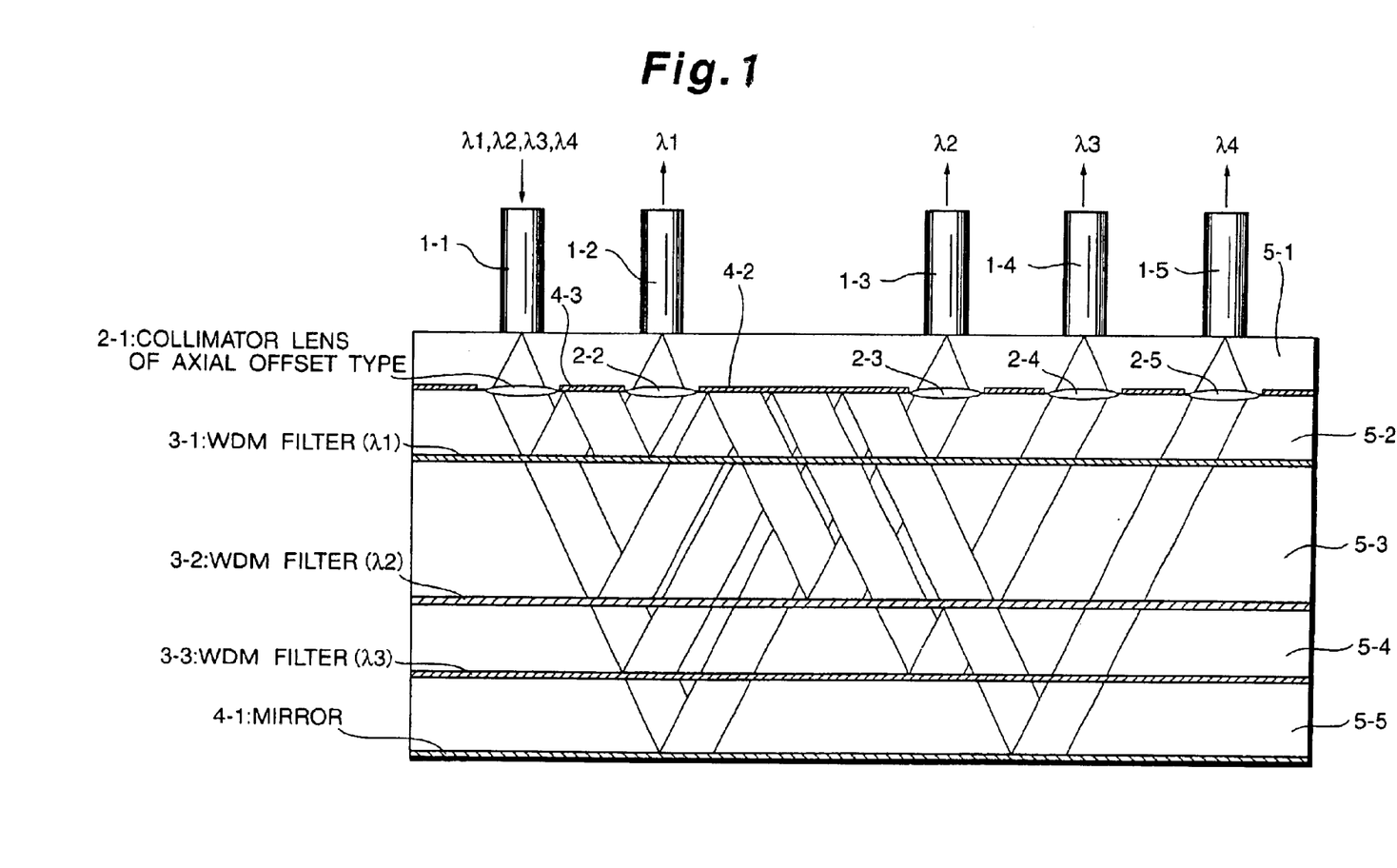
FIG. 1 is a constructional diagram of an optical demultiplexer for wavelength division multiplex communication according to the present invention.

FIG. 1 is a constructional diagram of the embodiment of an optical demultiplexer for wavelength division multiplex communication according to the present invention.

As shown in FIG. 1, the optical demultiplexer for wavelength division multiplex communication according to the present invention comprises: a plurality of optical fibers 1-1 to 1-5 arranged at certain intervals; a plurality of collimator lenses 2-1 to 2-5 of the axial offset type which are arranged below the plurality of optical fibers 1-1 to 1-5 so as to face plurality of optical fibers 1-1 to 1-5, respectively; a WDM filter ($\lambda 1$) 3-1, a WDM filter ($\lambda 2$) 3-2, a WDM filter ($\lambda 3$) 3-3, and a mirror 4-1 which are sequentially arranged below the plurality of collimeter lenses 2-1 to 2-5, respectively; and a plurality of light propagation media 5-1 to 5-5 which are arranged among the above-described constituent elements.

The optical fiber 1-1 is a light irradiating unit which receives the light multiplexed signal comprising four waves of the wavelengths $\lambda 1$ to $\lambda 4$ and irradiates the light multiplexed signal as a spherical wave from a core portion of an output end of the optical fiber 1-1. The optical fiber 1-1 is usually constructed by a single mode optical fiber. In this example, it is assumed that the wavelength $\lambda 1$=1340 nm, $\lambda 2$=1320 nm, $\lambda 3$=1300 nm, and $\lambda 4$=1280 nm.

The optical fiber 1-1 receives the light multiplexed signal from an optical network line via a relatively inexpensive connector such as an MT connector or the like. The light multiplexed signal is irradiated as a spherical wave from the front edge core portion of the optical fiber 1-1 in a manner similar to the case where light is irradiated from a focal point of a convex lens. The light multiplexed signal progresses in the light propagation medium 5-1 toward the collimator lens 2-1 of the axial offset type.

The collimator lens 2-1 of the axial offset type converts the light multiplexed signal which is irradiated from the optical fiber 1-1 into a parallel wave which progresses obliquely in the light propagation medium 5-2 toward the top WDM filter ($\lambda 1$) 3-1.

For example, if the method of the computer generated hologram disclosed in JP-Publication No.10-68808 (the same applicant as that of the present invention) is used, the collimator lens 2-1 of the axial offset type can be easily formed in an accurate position to achieve photolithography precision.

The WDM filter ($\lambda 1$) 3-1 is an optical filter for receiving, at a predetermined incident angle, the light multiplexed signal which has been converted into the parallel wave by the collimator lens 2-1 of the axial offset type, selecting and reflecting the light wave of the wavelength $\lambda 1$, and transmitting the residual light waves ($\lambda 2$, $\lambda 3$, $\lambda 4$) therethrough, i.e., the light waves remaining in the parallel wave after the light wave $\lambda 1$ is reflected by the WDM filter ($\lambda 1$) 3-1. Usually, the WDM filter ($\lambda 1$) 3-1 is manufactured by a dielectric multilayer film or the like formed by laminating dielectric thin films.

The light wave ($\lambda 1$) reflected by the WDM filter ($\lambda 1$) 3-1 is reflected toward a reflecting unit 4-3 which is arranged 80 as to be adjacent to the collimator lens 2-1 of the axial offset type. The transmitted light multiplexed signal ($\lambda 2$, $\lambda 3$, $\lambda 4$) progresses in the light propagation medium 5-3 toward the lower WDM filter ($\lambda 2$) 3-2.

Figure 2:
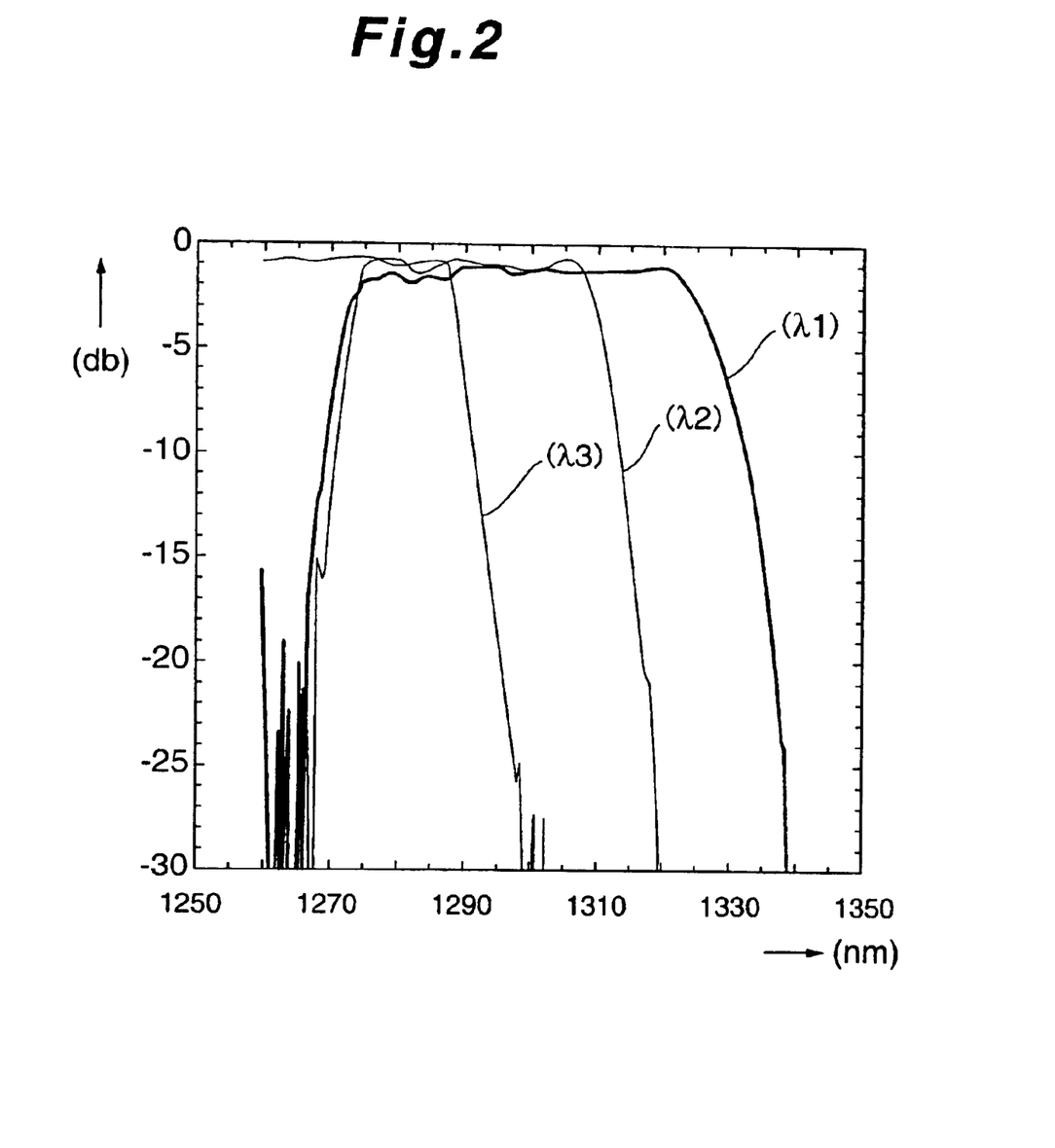
FIG. 2 is a diagram of the transmitting characteristics of WDM filters.
Figure 3:
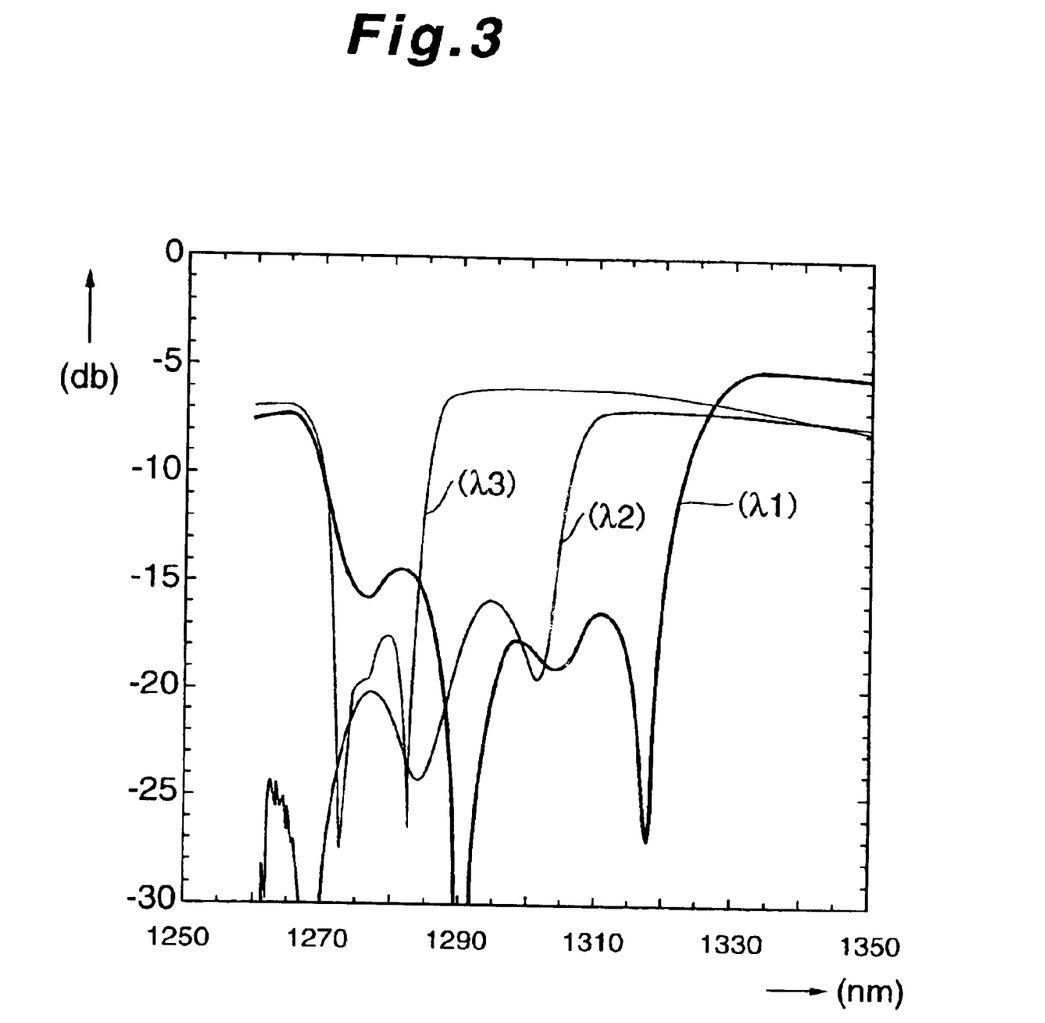
FIG. 3 is a diagram of the reflecting characteristics of the WDM filters.

Transmitting characteristics and reflecting characteristics of the WDM filters ($\lambda 1$) 3-1 to ($\lambda 3$) 3-3 will now be described.

FIG. 2 is a diagram of the transmitting characteristics of the WDM filters.

In FIG. 2, an ordinate axis indicates the intensity (db) of the transmitted light and an abscissa axis indicates a wavelength (nm). In FIG. 2, a curve ($\lambda 1$) shows the transmitting characteristics of the WDM filter ($\lambda 1$) 3-1, a curve ($\lambda 2$) shows the transmitting characteristics of the WDM filter ($\lambda 2$) 3-2, and a curve ($\lambda 3$) shows the transmitting characteristics of the WDM filter ($\lambda 3$) 3-3, respectively.

It will be understood from the curve ($\lambda 1$) that although the WDM filter ($\lambda 1$) 3-1 has a function of transmitting the incident light whose wavelength is shorter than 1340 nm ($\lambda 1$ in the present example), strictly speaking, the transmitted light intensity of the residual light waves, i.e., light waves λ2, λ3 and λ4, is not equal to 100%. Therefore, there is a case where a part of the light wave (λ2) and the like to be inherently transmitted is reflected by the WDM filter (λ1) 3-1. It will be understood from the curve (λ2) that although the WDM filter (λ2) 3-2 has a function of transmitting the incident light whose wavelength is shorter than 1320 nm (λ2 in the present example), strictly speaking, the transmitted light intensity of the residual light waves, i.e., light waves λ3 and λ4, is not equal to 100%. Therefore, there is a case where a part of the light waves to be inherently transmitted is reflected by the WDM filter (λ2) 3-2.

Further, it will be understood from the curve (λ3) that although the WDM filter (λ3) 3-3 has a function of transmitting the incident light whose wavelength is shorter than 1300 nm (λ3 in the present example), strictly speaking, the transmitted light intensity of the residual light waves, i.e., light wave λ4, is not equal to 100%. Therefore, there is a case where a part of the light waves to be inherently transmitted is reflected by the WDM filter (λ3) 3-3.

FIG. 3 is a diagram of the reflecting characteristics of the WDM filters.

In FIG. 3, an ordinate axis indicates the intensity (db) of the reflected light and an abscissa axis indicates a wavelength (nm). In FIG. 3, a curve (λ1) shows the reflecting characteristics of the WDM filter (λ1) 3-1, a curve (λ2) shows the reflecting characteristics of the WDM filter (λ2) 3-2, and a curve (λ3) shows the reflecting characteristics of the WDM filter (λ3) 3-3, respectively.

It will be understood from the curve (λ1) that although the WDM filter (λ1) 3-1 has a function of reflecting the incident light whose wavelength is longer than 1340 nm (λ1 in the present example), strictly speaking, the reflected light intensity therefrom is not equal to 100%. Therefore, there is a case where a part of the light waves to be inherently reflected is transmitted. It will be understood from the curve (λ2) that although the WDM filter (λ2) 3-2 has a function of reflecting the incident light whose wavelength is longer than 1320 nm (λ2 in the present example), strictly speaking, the reflected light intensity therefrom is not equal to 100%. Therefore, there is a case where a part of the light waves to be inherently reflected is transmitted.

Further, it will be understood from the curve (λ3) that although the WDM filter (λ3) 3-3 has a function of reflecting the incident light whose wavelength is longer than 1300 nm (λ3 in the present example), strictly speaking, the reflected light intensity therefrom is not equal to 100%. Therefore, there is a case where a part of the light waves to be inherently reflected is transmitted.

As mentioned above, in the WDM filters, a part of the light waves to be reflected is transmitted and a part of the light waves to be transmitted is reflected. Thus, crosstalks are generated. That is, for example, according to the reflected light intensity of the WDM filter (λ1) 3-1, as shown in FIG. 3, in the case of the light wave having the wavelength of 1340 nm, the 1340 nm wavelength light wave is reflected by an intensity of about −5 db, and in the case of the light wave having the wavelength of 1280 nm, the 1280 nm wavelength light wave is reflected by an intensity of about −15 db. Thus, the crosstalks between the light wave whose wavelength is equal to 1340 nm and the light wave whose wavelength is equal to 1280 nm are equal to about −10 db.

The explanation regarding the construction of the present invention will be continued with reference to FIG. 1 again.

The WDM filter (λ2) 3-2 is an optical filter for receiving, at a predetermined incident angle, the light multiplexed signal (λ2, λ3, λ4) which is transmitted through the WDM filter (λ1) 3-1, selecting and reflecting the light wave of the wavelength λ2, and transmitting the residual light waves of the wavelengths λ3 and λ4, i.e., the light waves remaining in the parallel wave after the light wave (λ1) is reflected by the WDM filter (λ1) 3-1 and the light wave (λ2) is reflected by the WDM filter (λ2) 3-2. Usually, the WDM filter (λ2) 3-2 is manufactured by a dielectric multilayer film or the like formed by laminating dielectric thin films.

The reflected light wave (λ2) is transmitted through the upper WDM filter (λ1) 3-1 and progresses toward the reflecting unit 4-2. On the other hand, the transmitted light multiplexed signal including the wavelengths λ3 and λ4 progresses in the light propagation medium 5-4 toward the lower WDM filter (λ3) 3-3. Similar to the WDM filter (λ1) 3-1, the WDM filter (λ2) 3-2 also reflects a part of the light waves (λ3, λ4) to be transmitted and transmits a part of the light wave (λ2) to be reflected.

The WDM filter (λ3) 3-3 is an optical filter for receiving, at a predetermined incident angle, the light multiplexed signal (λ3, λ4) which is transmitted through the WDM filter (λ2) 3-2, selecting and reflecting the light wave of the wavelength λ3, and transmitting the residual light wave of the wavelength λ4. Usually, the WDM filter (λ3) 3-3 is manufactured by a dielectric multilayer film or the like formed by laminating dielectric thin films.

The reflected light wave (λ3) is transmitted through the upper WDM filter (λ2) 3-2 and WDM filter (λ1) 3-1 and progresses toward the reflecting unit 4-2. On the other hand, the light wave of the wavelength λ4 is transmitted and, thereafter, progresses in the light propagation medium 5-5 toward the lower mirror 4-1. Similar to the WDM filter (λ1) 3-1 and the WDM filter (λ2) 3-2, the WDM filter (λ3) 3-3 also reflects a part of the light wave (λ4) to be transmitted and transmits a part of the light wave (λ3) to be reflected.

In the case of forming the WDM filters 3-1 to 3-3 by the dielectric multilayer film, the dielectric multilayer film can be adhered onto the surface of a predetermined light propagation medium by an evaporation deposition method or the like. The WDM filter adhered surface of the light propagation medium and the surface of another light propagation medium which is in contact therewith can be joined by using, for example, an adhesive agent of a UV hardening type or a thermo-setting type or another proper joining method.

The mirror 4-1 is constructed by a reflecting mirror and receives, at a predetermined incident angle, the light wave of the wavelength λ4 which is transmitted through the WDM filter (λ3) 3-3 and reflects the light wave of the wavelength λ4. Therefore, the light wave (λ4) is transmitted through all of the upper WDM filters and progresses toward the reflecting unit 4-2. Usually, the mirror 4-1 is also manufactured by a dielectric multilayer film formed by laminating dielectric thin films.

The reflecting units 4-2 and 4-3 are constructed by reflecting mirrors, receive the light waves λ1 to λ4 reflected by the WDM filters (λ1) 3-1 to (λ3) 3-3 and the mirror 4-1, and reflect the light waves λ1 to λ4 toward the WDM filter (λ1) 3-1 again. Therefore, the light wave (λ1) is again reflected by the WDM filter (λ1) 3-1, the light wave (λ2) is again reflected by the WDM filter (λ2) 3-2, the light wave (λ3) is again reflected by the WDM filter (λ3) 3-3, and the light wave (λ4) is again reflected by the mirror 4-1, respectively. Usually, the reflecting units 4-2 and 4-3 are also manufactured by dielectric multilayer films formed by laminating dielectric thin films.

The other collimator lens 2-2 of the axial offset type is arranged in a position so that the collimator lens 2-2 can receive the light wave of the wavelength $\lambda 1$ which is reflected again by the WDM filter ($\lambda 1$) 3-1. When the light wave ($\lambda 1$) is received, the collimator lens 2-2 converges the light wave ($\lambda 1$) and guides the light wave ($\lambda 1$) to the optical fiber 1-2 for demultiplexing.

The collimator lens 2-3 of the axial offset type is arranged in a position so that the collimator lens 2-3 can receive the light wave of the wavelength $\lambda 2$ which is reflected again by the WDM filter ($\lambda 2$) 3-2. When the light wave ($\lambda 2$) is received, the collimator lens 2-3 converges the light wave ($\lambda 2$) and guides the light wave ($\lambda 2$) to the optical fiber 1-3 for demultiplexing.

Further, the collimator lens 2-4 of the axial offset type is arranged in a position so that the collimator lens 2-4 can receive the light wave of the wavelength $\lambda 3$ which is reflected again by the WDM filter ($\lambda 3$) 3-3. When the light wave ($\lambda 3$) is received, the collimator lens 2-4 converges the light wave ($\lambda 3$) and guides the light wave $\lambda 3$ to the optical fiber 1-4 for demultiplexing.

The collimator lens 2-5 of the axial offset type is arranged in a position so that the collimator lens 2-5 can receive the light wave of the wavelength $\lambda 4$ which is reflected again by the mirror 4-1. When the light wave ($\lambda 4$) is received, the lens 2-5 converges the light wave ($\lambda 4$) and guides the light wave $\lambda 4$ to the optical fiber 1-5 for demultiplexing.

If the method of the computer-generated hologram disclosed in JP-Publication No.10-68808 is used, the collimator lenses 2-2 to 2-5 of the axial offset type can be easily formed in accurate positions to achieve photolithography precision.

As described above, the collimator lenses 2-2 to 2-5 of the axial offset type are used as guide lenses for guiding the light waves which are reflected again to the optical fibers 1-2 to 1-5 (light receiving units) for demultiplexing, respectively.

The optical fibers 1-2 to 1-5 for demultiplexing comprise single mode optical fibers and are arranged so as to face focal positions of the collimator lenses 2-2 to 2-5 of the axial offset type so as to receive the light waves (the four waves of $\lambda 1$ to $\lambda 4$), respectively.

The optical fibers 1-1 to 1-5 can be constructed as a unit. In this case, the unit is formed as a MT connector or a structure according thereto, or each optical fiber can be attached to a V-shaped groove of a substrate with the V-shaped groove.

Each of the light waves demultiplexed as mentioned above is sent via each of the optical fibers 1-2 to 1-5, respectively, to an optical network by which a single light wave is propagated.

Each of the light propagation media 5-1 to 5-5 is formed by an optical substrate (for example, a thickness is equal to about 1.5 mm) of quartz glass or the like so as to propagate the light wave.

The collimator lenses 2-1 to 2-5 of the axial offset type and the reflecting units 4-2 and 4-3 are arranged between the light propagation media 5-1 and 5-2.

The collimator lenses 2-1 to 2-5 of the axial offset type are formed as CGH (computer generated hologram) devices onto the opposite surface of either the light propagation medium 5-1 or 5-2. In this case, it is desirable to mutually adhere the surfaces other than the lens positions of the light propagation media 5-1 and 5-2 by using the adhesive agent of the UV hardening type or the thermo-setting type or the like.

The collimator lenses 2-1 to 2-5 of the axial offset type can be formed as refracting type lenses by a molding method or can be formed as refractive index distributing type lenses by a technique such as ion exchange or the like.

The WDM filter ($\lambda 1$) 3-1 is arranged between the light propagation media 5-2 and 5-3. The WDM filter ($\lambda 2$) 3-2 is arranged between the light propagation media 5-3 and 5-4. The WDM filter ($\lambda 3$) 3-3 is arranged between the light propagation media 5-4 and 5-5. The mirror 4-1 is provided under the lower surface of the light propagation medium 5-5.

Reflecting mirrors formed by the evaporation deposition of a metal film in place of the dielectric multilayer film can be used as the mirror 4-1 and reflecting units 4-2 and 4-3. As a metal film, for example, it is possible to use an aluminum film, a chromium film, or a laminate film constructed by forming a gold film onto the chromium film.

<Operation of the embodiment>

According to the optical demultiplexer of the present invention for wavelength division multiplex communication having the construction as described above, for example, the light multiplexed signal in which four light waves of the wavelength $\lambda 1=1340$ nm, $\lambda 2=1320$ nm, $\lambda 3=1300$ nm, and $\lambda 4=1280$ nm have been multiplexed is inputted from the public line to the optical fiber 1-1 via the MT connector.

The light multiplexed signal ($\lambda 1, \lambda 2, \lambda 3, \lambda 4$), after being output from the core portion at the end of the optical fiber 1-1 as a spherical wave, passes through the light propagation medium 5-1 and enters the collimator lens 2-1 of the axial offset type. The collimator lens 2-1 changes the spherical wave into a parallel wave which advances forward in a tilted (angled) direction. Then, the parallel wave, while advancing forward (progressing toward) the mirror 4-1, is transmitted by the light propagation mediums 5-2-5-5. In the meantime, the light waves with predetermined wavelengths $\lambda 1, \lambda 2, \lambda 3$ and $\lambda 4$ that are included in the parallel wave are reflected by the WDM filter ($\lambda 1$) 3-1, the WDM filter ($\lambda 2$) 3-2, the WDM filter ($\lambda 3$) 3-3 and the mirror 4-1, respectively.

The light wave with wavelength $\lambda 1$ which is reflected by the WDM filter ($\lambda 1$) 3-1, with a reflection angle being equal to the incidence angle, is transmitted a second time by the light propagation medium 5-2 and reaches the reflecting unit 4-3.

Continuously, the light wave with wavelength $\lambda 1$ is reflected again by the reflecting unit 4-3 and is transmitted a third time by the light propagation medium 5-2. The light wave with wavelength $\lambda 1$ then reaches the WDM filter ($\lambda 1$) 3-1 again. Thereby, the light wave ($\lambda 1$), after being reflected again by the WDM filter ($\lambda 1$) 3-1 and transmitted a fourth time by the light propagation medium 5-2, reaches the collimator lens 2-2 of the axial offset type. Then, the collimator lens 2-2 converges the light wave ($\lambda 1$) into the core portion at the end of the optical fiber 1-2.

Thus, in the first reflected light wave ($\lambda 1$), even if there are some other light waves remaining with other wavelengths as cross talk components in the reflected light wave, when the light wave ($\lambda 1$), as stated above, is reflected again by the WDM filter ($\lambda 1$) 3-1, the cross talk components can be almost transmitted through by the WDM filter ($\lambda 1$) 3-1. Therefore, it is possible to guide the light wave ($\lambda 1$) with a large reduction in cross talk components to the optical fiber by the collimator lens 2-2.

The light wave ($\lambda 1$) is sent via the optical fiber 1-2 to the optical network by which the light wave of a single wavelength $\lambda 1$ is propagated. The light wave components (crosstalk components) of the other wavelengths are attenuated while repeating the reflection in the optical demultiplexer.

The light multiplexed signal ($\lambda 2, \lambda 3, \lambda 4$) which is transmitted through the WDM filter ($\lambda 1$) 3-1 passes through the light propagation medium 5-3 and reaches the WDM filter ($\lambda 2$) 3-2. The light wave of the wavelength $\lambda 2$ is then reflected by the WDM filter ($\lambda 2$) 3-2 and progresses toward the reflecting unit 4-2. The light multiplexed signal ($\lambda 3, \lambda 4$)

which is transmitted through the WDM filter ($\lambda 2$) 3-2 is propagated in the light propagation medium 5-4 and progresses toward the VDM filter ($\lambda 3$) 3-3.

The light wave of the wavelength $\lambda 2$ which reached the reflecting unit 4-2 is reflected by the reflecting unit 4-2, transmitted through the WDM filter ($\lambda 1$) 3-1, and returned to the WDM filter ($\lambda 2$) 3-2. Therefore, the light wave ($\lambda 2$) is reflected again by the WDM filter ($\lambda 2$) 3-2 and is converged to the core portion at the front edge of the optical fiber 1-3 by the collimator lens 2-3 of the axial offset type.

Similar to the light wave ($\lambda 1$), the light wave components of the other wavelengths as crosstalk components are included in the light wave of the wavelength $\lambda 2$ which was first reflected. When the light wave ($\lambda 2$) is reflected again by the WDM filter ($\lambda 2$) 3-2, most of the light wave components (crosstalk components) of the other wavelengths are transmitted through the WDM filter ($\lambda 2$) 3-2. Therefore, the light wave ($\lambda 2$) in which the light wave components (crosstalk components) of the other wavelengths have been remarkably reduced is guided to the optical fiber 1-3 by the collimator lens 2-3 of the axial offset type. The light wave ($\lambda 2$) is sent via the optical fiber 1-3 to the optical network by which the light wave of a single wavelength $\lambda 2$ is propagated. The light wave components (crosstalk components) of the other wavelengths are attenuated while repeating the reflection in the apparatus.

The light multiplexed signal ($\lambda 3$, $\lambda 4$) is transmitted through the WDM filter ($\lambda 2$) 3-2 and propagated in the light propagation medium 5-4, and progresses toward the WDM filter ($\lambda 3$) 3-3.

Although the light wave components of the other wavelengths as crosstalk components are also similarly included in the light wave ($\lambda 3$) which is reflected by the WDM filter ($\lambda 3$) 3-3, the light wave ($\lambda 3$) is reflected by the reflecting unit 4-2 and is reflected again by the WDM filter ($\lambda 3$) 3-3. Therefore, at the time of the reflection, most of the light wave components (crosstalk components) of the other wavelengths included in the light wave ($\lambda 3$) are transmitted through the WDM filter ($\lambda 3$). Thus, the light wave ($\lambda 3$) in which the light wave components (crosstalk components) of the other wavelengths have been remarkably reduced is guided to the optical fiber 1-4 by the collimator lens 2-4 of the axial offset type. The light wave ($\lambda 3$) is sent via the optical fiber 1-4 to the optical network by which the light wave of a single wavelength ($\lambda 3$) is propagated.

The light wave of the wavelength $\lambda 4$ which is transmitted through the WDM filter ($\lambda 3$) 3-3 is reflected by the mirror 4-1, is similarly reflected again by the reflecting unit 4-2, and is reflected again by the mirror 4-1. The mirror 4-1 is formed so as to reflect the light waves $\lambda 1$ to $\lambda 4$. If the light wave components (crosstalk components) of the other wavelengths are included in the light wave ($\lambda 4$) which is reflected by the reflecting unit 4-2, there is a concern that the light wave components (crosstalk components) will be reflected again as they are progressed toward the collimator lens 2-5 of the axial offset type.

Since the light wave components (crosstalk components) of the other wavelengths that are included in the light wave ($\lambda 4$) which is reflected by the reflecting unit 4-2 reach the mirror 4-1 while being reflected by each WDM filter, the light wave components (crosstalk components) of the other wavelengths that are included in the light wave ($\lambda 4$) have been reduced at a point when this light wave is reflected again by the mirror 4-1. Therefore, the light wave ($\lambda 4$) in which the light wave components (crosstalk components) of the other wavelengths have been reduced is similarly guided to the optical fiber 1-5 by the collimator lens 2-5 of the axial offset type. The light wave ($\lambda 4$) is sent via the optical fiber 1-5 to the optical network by which the light wave of a single wavelength ($\lambda 4$) is propagated.

The embodiment has been described above with respect to the demultiplexer constructed in a manner as described above such that the light multiplexed signal ($\lambda 1$, $\lambda 2$, $\lambda 3$, $\lambda 4$) is inputted from the optical fiber 1-1, the light wave of the wavelength $\lambda 1$ is demultiplexed and outputted from the optical fiber 1-2, the light wave of the wavelength $\lambda 2$ is demultiplexed and outputted from the optical fiber 1-3, the light wave of the wavelength $\lambda 3$ is demultiplexed and outputted from the optical fiber 1-4, and the light wave of the wavelength $\lambda 4$ is demultiplexed and outputted from the optical fiber 1-5, respectively.

However, the present invention is not limited to the foregoing embodiment and can be applied to the demultiplexing of the light waves of a larger number of wavelengths.

The demultiplexer of the present invention can be also used as a multiplexer for obtaining the light multiplexed signal ($\lambda 1$, $\lambda 2$, $\lambda 3$, $\lambda 4$) in which four waves have been multiplexed from the optical fiber 1-1 by irradiating the light wave of the wavelength $\lambda 1$ from the optical fiber 1-2, irradiating the light wave of the wavelength $\lambda 2$ from the optical fiber 1-3, irradiating the light wave of the wavelength $\lambda 3$ from the optical fiber 1-4, and irradiating the light wave of the wavelength $\lambda 4$ from the optical fiber 1-5, respectively.

That is, the light waves each having the single wavelength among the wavelengths $\lambda 1$ to $\lambda 4$ which are irradiated from the optical fibers 1-2 to 1-5 are converted into the parallel waves by the collimator lenses 2-2 to 2-5 of the axial offset type, respectively. The light wave of the wavelength $\lambda 1$ is reflected by the WDM filter ($\lambda 1$) 3-1, the light wave of the wavelength $\lambda 2$ is reflected by the WDM filter ($\lambda 2$) 3-2, the light wave of the wavelength $\lambda 3$ is reflected by the WDM filter ($\lambda 3$) 3-3, and the light wave of the wavelength $\lambda 4$ is reflected by the mirror 4-1, respectively.

Subsequently, the reflected light wave of the wavelength $\lambda 1$ is reflected by the reflecting unit 4-3 and the reflected light waves of the wavelengths $\lambda 2$, $\lambda 3$, and $\lambda 4$ are reflected by the reflecting unit 4-2, respectively. The light wave of the wavelength $\lambda 1$ is reflected again by the WDM filter ($\lambda 1$) 3-1, the light wave of the wavelength $\lambda 2$ is reflected again by the WDM filter ($\lambda 2$) 3-2, the light wave of the wavelength $\lambda 3$ is reflected again by the WDM filter ($\lambda 3$) 3-3, and the light wave of the wavelength $\lambda 4$ is reflected again by the mirror 4-1, respectively. All of the four reflected light waves of the wavelengths $\lambda 1$ to $\lambda 4$ progress toward the collimator lens 2-1 of the axial offset type in a state where they have been multiplexed. The collimator lens 2-1 of the axial offset type allows the multiplexed light including the light waves of the wavelengths $\lambda 1$ to $\lambda 4$ to enter the optical fiber 1-1. Since such an operation is substantially similar to the operation in the case of the demultiplexer except that the progressing direction of the light waves is reversed, its explanation is omitted.

According to such a multiplexer, in the case where light wave components of the different wavelengths are included in each of the light waves ($\lambda 1$ to $\lambda 4$) which are irradiated from the optical fibers 1-2 to 1-5, when the light waves are reflected by the reflecting units 4-2 and 4-3 and are reflected again by the WDM filters 3-1 to 3-3, the unnecessary light wave components can be transmitted by those filters. Thus, the light waves which hardly include the unnecessary light wave components can be multiplexed.

Although the mirror 4-1 has been arranged at the bottom in FIG. 1 in the foregoing embodiment, a WDM filter ($\lambda 4$)

for reflecting the light wave of the wavelength λ4 and transmitting the light waves of the other wavelengths can be arranged in place of the mirror 4-1.

In the foregoing embodiment, it is also possible to construct the optical demultiplexer and multiplexer in such a manner that the light waves which are reflected again by the WDM filters 3-1 to 3-3 and the mirror 4-1 are reflected again toward the WDM filters 3-1 to 3-3 and the mirror 4-1 by other reflecting units which are arranged at positions where those light waves are received, and the light waves which are reflected again by the WDM filters 3-1 to 3-3 and the mirror 4-1 are received by the collimator lenses 2-2 to 2-5 of the axial offset type.

It is also possible to provide another reflecting unit and reflect the light waves by the WDM filters 3-1 to 3-3 and the mirror 4-1 four or more times.

The parallel wave is selected and reflected by the predetermined WDM filter every wavelength during the straight progress. At this stage, the crosstalk components are removed. Further, the reflected parallel wave is reflected by the reflecting units, returned to the predetermined WDM filter, and selected and reflected again. In this stage, since the light wave obtained after the crosstalk components were removed once is wavelength-selected again by the same WDM filter, the crosstalk components are extremely reduced.

The present invention is not limited to the foregoing exemplary embodiment, and it is to be understood that many modifications and variations are possible within the spirit and scope of the appended claims of the present invention.

What is claimed is:

1. An optical demultiplexer for wavelength division multiplex communication, said optical demultiplexer comprising:

a light irradiating unit operable to irradiate a spherical wave containing a plurality of light waves with different wavelengths;

a plurality of light receiving units operable to respectively receive the plurality of light waves contained in the spherical wave;

a converting lens operable to convert the irradiated spherical wave into a parallel wave;

a plurality of WDM filters operable to respectively and differently reflect in sequence only one of the light waves from among the plurality of light waves contained in the parallel wave, and to transmit therethrough each of the light waves of the plurality of light waves contained in the parallel wave having a different wavelength than the reflected one of the light waves;

a plurality of guide lenses operable to converge each of the light waves respectively reflected by said plurality of WDM filters into each of said light receiving units, respectively; and at least one reflecting unit operable to reflect each of the light waves respectively reflected by said plurality of WDM filters to direct each of the reflected light waves to respectively return to a corresponding one of said plurality of WDM filters in which the reflected light wave was first reflected at least one more time so as to cause each of the light waves having a different wavelength than the light wave reflected by the corresponding one of said plurality of WDM filters remaining together with the light wave reflected by the corresponding one of said plurality of WDM filters to be again transmitted through the corresponding one of said plurality of WDM filters, wherein each of the plurality of guide lens is placed at a position so as to be operable to respectively guide one of the plurality of light waves after having been respectively reflected by said plurality of said WDM filters the at least one more time into a corresponding one of said plurality of light receiving units.

2. The optical demultiplexer according to claim 1, wherein the corresponding one of said plurality of WDM filters operable to reflect a finally remaining light wave among the plurality of light waves in the parallel wave is a reflecting mirror.

3. An optical multiplexer for wavelength division multiplex communication, said optical multiplexer comprising:

a plurality of light irradiating units operable to irradiate a plurality of light waves each with different wavelengths;

a light receiving unit operable to receive the plurality of light waves being multiplexed;

a plurality of converting lenses operable to convert the plurality of light waves irradiated by said plurality of light irradiating units into a plurality of parallel waves, respectively;

a plurality of WDM filters operable to respectively and differently reflect in sequence only one of the plurality of the parallel waves from among the plurality of parallel waves, and to transmit therethrough each of the parallel waves of the plurality of parallel waves having a different wavelength than the reflected one of the plurality of parallel waves;

a guide lens operable to converge each of the plurality of parallel waves respectively reflected by said plurality of WDM filters into said light receiving unit; and at least one reflecting unit operable to reflect each of the parallel waves respectively reflected by said plurality of WDM filters to direct each of the reflected parallel waves to respectively return to a corresponding one of said WDM filters at least one more time so as to cause each of the parallel waves having a different wavelength than the parallel wave reflected by the corresponding one of said plurality of WDM filters remaining together withe the light wave reflected by the corresponding one of said plurality of WDM filters to be again transmitted through the corresponding one of said plurality of WDM filters, wherein said guide lens is placed at a position so as to be operable to multiplex the plurality of parallel waves after having been respectively reflected by said plurality of WDM filters the at least one more time and the multiplexed plurality of parallel waves into said light receiving unit.

4. The optical multiplexer according to claim 3, wherein the corresponding one of said plurality of WDM filters operable to reflect a final parallel wave among the plurality of parallel waves transmitted through by each of the other plurality of said WDM filters is a reflecting mirror.

* * * * *